(12) United States Patent
Sveen et al.

(10) Patent No.: US 12,740,549 B2
(45) Date of Patent: Sep. 22, 2026

(54) PLANT FOR AQUACULTURE AND OUTLET FOR AQUACULTURE TANKS AND OTHER USES THEREOF

(71) Applicant: BUE SALMON AS, Bulandet (NO)

(72) Inventors: Ola Sveen, Florø (NO); Kenneth Glomset, Ålesund (NO)

(73) Assignee: BUE SALMON AS, Bulandet (NO)

( * ) Notice: Subject to any disclaimer, the term of this patent is extended or adjusted under 35 U.S.C. 154(b) by 0 days.

(21) Appl. No.: 18/992,244

(22) PCT Filed: Jul. 6, 2023

(86) PCT No.: PCT/NO2023/060014
§ 371 (c)(1),
(2) Date: Jan. 8, 2025

(87) PCT Pub. No.: WO2024/010462
PCT Pub. Date: Jan. 11, 2024

(65) Prior Publication Data

US 2026/0013481 A1 Jan. 15, 2026

(30) Foreign Application Priority Data

Jul. 8, 2022 (NO) .................................... 20220788

(51) Int. Cl.
*A01K 63/10* (2017.01)
*A01K 63/04* (2006.01)

(52) U.S. Cl.
CPC ............ *A01K 63/10* (2017.01); *A01K 63/045* (2013.01); *A01K 63/042* (2013.01); *A01K 63/047* (2013.01)

(58) Field of Classification Search
CPC ........ A01K 63/04; Y02A 40/81; B01D 21/24; B01D 21/2405; B01D 21/2416;
(Continued)

(56) References Cited

U.S. PATENT DOCUMENTS 4,636,320 A * 1/1987 Figiel ........................ C23G 5/04 210/801
4,687,575 A * 8/1987 Grose .................. A01K 63/045 119/260

(Continued)

FOREIGN PATENT DOCUMENTS

CN 211793805 U * 10/2020
CN 214178709 U 9/2021

(Continued)

OTHER PUBLICATIONS

International Search Report issued in corresponding International Application No. PCT/NO2023/060014, dated Sep. 21, 2023, pp. 1-3.

(Continued)

*Primary Examiner* — Joshua J Michener
*Assistant Examiner* — Nicole Paige Maccrate
(74) *Attorney, Agent, or Firm* — Carter, DeLuca & Farrell LLP; George Likourezos

(57) ABSTRACT

A plant for aquaculture, for farming of fish or other aquatic species, comprising a closed or semi-closed tank, at least one inlet for water to the tank and an outlet for water from the tank. The plant is distinguished in that the outlet comprises two pipes, wherein an outer pipe is arranged outside an inner pipe, the outer pipe extends from a bottom of the tank up to an outer pipe upper end, and the outer pipe comprises openings distributed along the immersed part of the outer pipe, the inner pipe extends from the bottom of the tank up to an inner pipe upper end, and the inner pipe comprises an outlet opening at the inner pipe upper end and/or outlet openings at elevation below the inner pipe upper end, and (Continued)

a main outlet from the tank is arranged in the tank bottom in position inside the inner pipe.

10 Claims, 3 Drawing Sheets

(58) Field of Classification Search
CPC .............. B01D 21/2422; B01D 21/245; B01D 21/2488; B01D 21/0042; B01D 21/0069; C02F 2103/20; C02F 2103/22
USPC .............. 210/416.2, 801, 803, 170.02, 532.1
See application file for complete search history.

(56) References Cited

U.S. PATENT DOCUMENTS

| | | | |
|---|---|---|---|
| 5,450,818 | A | 9/1995 | Caillouet |
| 5,762,024 | A | 6/1998 | Meilahn |

FOREIGN PATENT DOCUMENTS

| | | | | | |
|---|---|---|---|---|---|
| CN | 214593646 | U | | 11/2021 | |
| KR | 102101440 | B1 | * | 4/2020 | ............ A01K 63/04 |
| WO | 81/01526 | A1 | | 6/1981 | |
| WO | 2006/000042 | A1 | | 1/2006 | |
| WO | 2018/074976 | A1 | | 4/2018 | |

OTHER PUBLICATIONS

Written Opinion of the International Searching Authority issued in corresponding International Application No. PCT/NO2023/060014, dated Sep. 21, 2023, pp. 1-4.

Search Report issued by the Norwegian Patent Office on Feb. 6, 2023 in corresponding NO Patent Application No. 20220788.

* cited by examiner 24
10
21
12
13
1
14
15
16
19
11
17
20
6
7
5
9
8
18
2
26
3
4

24
10
21
12
13
1
14
15
16
19
11
17
20
6
7
5
9
8
18
2
26
3
4

PLANT FOR AQUACULTURE AND OUTLET FOR AQUACULTURE TANKS AND OTHER USES THEREOF

CROSS-REFERENCE TO RELATED APPLICATION(S)

This is a national stage application filed under 37 U.S.C. 371 based on International Patent Application No. PCT/NO2023/060014, filed Jul. 6, 2023, which claims priority to Norwegian patent application No. 20220788 filed Jul. 8, 2022, the entire contents of which are incorporated herein by reference in their entirety.

TECHNICAL FIELD

The present invention relates specifically to aquaculture of salmon, trout, other fish, crustaceans, or other aquatic animals.

In more general, the invention relates to particle or substance removal from fluids, such as for aquaculture, water treatment, process water cleaning, drinking water cleaning, and general header tank outlets, for numerous processes.

BACKGROUND ART

Shortage of food can be a serious global problem in the future. Fish farming and other aquaculture can be significant parts of the solution. However, fish farming in open nets or cages in the water may result in severe problems with pollution, sea lice, other parasites, and pathogens, and may become illegal or at least restricted in a way that limits growth in many areas in the future. Closed or semi-closed tanks or structures, on land or floating in the sea, can reduce or eliminate the problems. For fish farming and other types of aquaculture in closed or semi-closed tanks or structures, water is preferably recirculated, especially for aquaculture on land.

The technology for recirculating water requires water cleaning by sedimentation, filtering, and often further steps and conditioning. Removal of $CO_2$ and addition of $O_2$ are typically required. With extensive water treatment, RAS (Recirculating Aquaculture Systems) are enabled.

The present invention can be relevant for many embodiments of aquaculture but is most relevant for aquaculture with recirculation of the water, to a large or a small extent. For Re-Use systems that only add a $CO_2$ removal loop, typically 20% up to about 80% of the water is recirculated, most typically about 40-70% recirculation. For RAS systems typically 80-99% of the water is recirculated requiring an even more extensive water treatment using biological filters. Plants or tanks for aquaculture on land may require recirculation of water to a large extent, but recirculation can also be beneficial for plants with floating fully closed or semi-closed tanks. Surplus food and feces should be separated out from the water. Any dead fish should also be removed.

The waste from aquaculture can be significant, resulting in pollution and/or emissions. The process train for enabling reduced or eliminated waste, pollution and emissions from aquaculture can be surprisingly extensive and expensive.

Relevant art, representing state of the art, are the patent publications WO 8101526 A1, CN 214593646U U, U.S. Pat. No. 5,762,024 A, WO 2018074976 A1, U.S. Pat. No. 5,450,818 A and WO 2006000042 A1.

A demand exists for technology that can reduce the cost for providing water quality as required for closed or semi-closed aquaculture with recirculation of water to a large or smaller extent.

SUMMARY OF INVENTION

The invention meets the demand by providing a plant for aquaculture, for farming of fish or other aquatic species, comprising a closed or semi-closed tank, at least one inlet for water to the tank and an outlet for water from the tank. The plant is distinguished in that the outlet comprises two pipes, an outer pipe and an inner pipe, wherein the outer pipe is arranged outside the inner pipe, wherein the outer pipe extends from a bottom of the tank up to an outer pipe upper end, and the outer pipe comprises openings distributed along the immersed part of the outer pipe, wherein the inner pipe extends from the bottom of the tank up to an inner pipe upper end, and the inner pipe comprises an outlet opening at the inner pipe upper end and/or outlet openings at elevation below the inner pipe upper end, and wherein a main outlet from the tank is arranged in the tank bottom in position inside the inner pipe, further comprising a primary sludge outlet, arranged in the tank bottom outside the outer pipe, preferably around the outer pipe, and a secondary sludge outlet, arranged in the tank bottom outside the inner pipe, preferably around the inner pipe, but inside the outer pipe, wherein water brought into the tank through the at least one inlet preferably flows in substance circular and radial inside the tank, in substance by laminar and/or diverging flow, into and through the openings distributed along the immersed part of the outer pipe, into an annular water column formed between the inner and outer pipe, upwards through the annular water column, into and through the inner pipe outlet, down the inner pipe and out through the main outlet, whilst sludge is separated and brought out from the tank through the primary sludge outlet and the secondary sludge outlet.

The circular and radial flow transforms from in substance circular to more radial towards the openings of the outer pipe, in a spiral-like flow trajectory. Said flow is in substance without any vertical flow direction component and in substance without turbulence, at least over a major part of the tank water column. Instead, the flow is in substance or purely laminar, resulting in improved sedimentation of primary sludge and removal of primary sludge through the primary sludge outlet. Flow lines or particle trajectories are preferably parallel or diverging, preferably without crossing other flowlines or trajectories, most preferably parallel in order to minimize particle/sludge fracturing.

The inner and outer pipes are preferably central and coaxial to a vertical tank axis. The inner and outer pipes, extending from the bottom of the tank, are closed against the bottom of the tank, closing for any flow from the tank volume under the lower pipe ends and into said pipes. The result is reduced flow rate and more stagnant water in the lowermost volume of the tank and the lowermost volume in the annular water column between the inner and outer pipes, providing improved separation effect in two stages.

The outer pipe extends up to an upper end, at, above or below a tank water level. The tank water level is also termed an operation water level. The inner pipe preferably comprises outlet at the inner pipe upper end or/and openings at elevation below the inner pipe upper end, at an elevation or a range of elevations below the tank water level and/or the outer pipe upper end. In some preferable embodiments, the outer pipe has upper end below the tank water level, with the inner pipe inside and below the outer pipe upper end.

With the present invention several beneficial effects are provided. Sludge is separated, that is removed, in two stages. The primary sludge outlet enables removal of coarse sludge, including faeces, and any food spillage. Any dead fish is preferably removed through a separate outlet. The primary sludge outlet may remove sludge of size from microscopic size up to larger or equal size as the openings in the outer pipe and/or particles and/or sludge of similar or higher density than the water. The outer pipe openings preferably are of equal or smaller size than the primary sludge outlet openings. All openings may comprise filters or screens. The secondary sludge outlet enables sludge removal of finer sludge and sludge of near neutral density in water, passing through the openings/filters/screens in the outer pipe and accumulating in the relatively stagnant lower part of the annular water column between the outer and inner pipes. The sludge removed and brought out through the sludge outlets, is typically a concentration of sludge in water, typically with a few percent of the total water flow through the tank, such as typically 1-20% of total water flow through the primary sludge outlet and typically 1-15% of total water flow rate through the tank for each of the sludge outlets. The distribution of openings along the immersed part of the outer pipe enables a more laminar flow with minimized turbulence and minimized occurrence of stagnant volumes at elevation above said lowermost volumes of the tank and into the annular column between the outer and inner pipes. The more laminar flow, in contrast to turbulence, avoids crushing sludge particles into fragments. The more laminar flow over the water column height, also minimize occurrence of unwanted stagnant volumes, thereby minimizing sedimentation of particles in stagnant volumes, reducing possible acidification and eventual formation of $H_2S$ gas due to anaerobic breakdown of sedimented organic matter. In contrast, in typical plants for aquaculture with recirculation, a relatively large part of the water, with entrained particles and sludge of numerous kinds, is pumped out from the tank for external filtering, wherein high local velocity and turbulence due to heavy pumping and shear breaks up the particles into smaller fragments or dissolve more of the particles/sludge into the water, increasing the problems for separating out sludge and increasing the contents of solved pollution. With the present invention, the separation of sludge is facilitated, while the energy consumption and structural requirements and related investments and operations are reduced.

Contrary to state-of-the-art knowledge, recommending good mixing in the whole tank volume for enabling better food distribution and reducing the risk for stagnant volumes with acidification in the whole tank volume. However, the good mixing results in crossing of water/sludge flow components in principle taking place in the full tank volume. In contrast, the present invention provides a in substance laminar circular-radial flow in the tank, minimizing turbulence and mixing. Surprisingly, the effect is minimizing of sludge/particle crushing and significantly reduced total separation and conditioning requirement. With the tank and/or tank outlet of the present invention, practical testing indicates that the effects are surprisingly significant also with large fish in the tank, meaning that the flow pattern in the tank is maintained.

The technical effect is that the total process train for achieving a specific water quality can be significantly reduced. The economic effect is reduced investment cost and reduced operational cost. Without wishing to be bound by theory, the effect is assumed to be related to very effective removal of sludge at an early stage, in two separation steps, combined with fluid mechanical flow conditions that reduce or eliminate crushing and mixing of the sludge particles to be removed, by providing identical flow pattern and velocity through the full water column or most of the water column. Only an interval lowermost and optionally uppermost of the water column can for some preferable embodiments be without openings of the outer pipe, and preferably combined with inlet openings at corresponding elevation. With the plant and outlet of the present invention, enhanced particle and biomass filtration by reducing or avoiding particle fragmentation and dissolving is enabled. The particles and further biomass can be used for bio-gas production, in or as fertilizers for agriculture, and some crustaceans and other aquaculture animals can use at least some of the particles and biomass as food.

The term pipe in this context means any feasible hollow structure, such as quadratic or elliptical cross section pipes. The inner pipe can extend above the outlet elevation, by having outlets of sufficient size at appropriate elevations.

However, the tank is preferably circular in cross-section, the outer pipe and the inner pipe are preferably circular in cross-section and arranged coaxial along a vertical tank axis, and preferably the inner pipe has upper end at the outlet elevation, wherein the upper end is the outlet elevation. Circular cross-section shape is most preferred since the best flow pattern, with a minimum of turbulence, mixing and stagnant volumes, and a maximum of laminar flow, can be achieved. Alternatively, the tank and/or pipes are hexagonal, quadratic, pentagonal or has other shape in cross section. Hexagonal or octagonal tank and optional hexagonal or octagonal pipes can also be preferable, such as for close-packed arrangement of the tanks.

In some preferable embodiments the outer pipe upper end is situated below the water surface of the tank, and thereby submerged resulting into the need of closing the upper end of the outer pipe fully, or partially using a filter. This results into that the inner pipe upper end needs to be situated below the outer pipe end and being fully submerged to a point lower than the outer pipe end. Level control is preferably provided by the plant comprising a separate arrangement outside the tank or tanks for aquaculture, preferably governed by water treatment tanks or equipment at appropriately lower level, preferably successive like a cascade, providing flow by gravity from one process step to the next.

Preferably, the outer pipe comprises openings arranged with filters or screens distributed along and around the immersed part of the outer pipe, preferably with openings/filters-screens evenly distributed along and around the whole immersed part. Openings/filters are preferably evenly distributed along and around the outer pipe, for example every 0.5 m or 1 m elevation or every 30° or 60° around the circumference. For some embodiments, said openings are preferably omitted or can be closed for the lowermost elevations, such as 1 m, 2 m or 3 m up from the tank bottom and/or are preferably omitted or can be closed for the upper 1 m. Reduced flow velocity for improved sedimentation of sludge towards the primary and secondary sludge outlet is the reason for the preferable lack of openings/filters at the lowermost elevations or positions. This is relevant for growing salmon, especially larger size salmon, or other fish species having advantage of relatively high tank flow velocity to provide an optimized environment for fish growth and performance.

The plant preferably comprises filters or screens with controllable openings, and/or replaceable filters or screens. This is desired to be able to adjust the water speed across the screens within an optimal range when water consumption in the tank is changed. Such changes in water consumption normally take place as fish grows and the load of the tank changes. Water consumption is increased with increased biomass to mainly support a water quality that has reasonable $CO_2$ levels such as below 15 mg/l. By changing the screens size/light opening to accommodate changes in flow a desired water speed across the screens can be maintained that results into rapid but gentle particle transfer through the screen. Increased water usage and thereby increased water velocity inside the tank volume will result into decreased segmentation taking place inside the tank. With decreased segmentation in the tank volume a lower number of particles will be collected in the primary sludge as they are kept in suspension by the high turning velocity inside the tank. The invention solves this problem by adding a secondary sludge collection inside the outer tube of the outlet design. When water leaves the tank at high water turning velocity and enters the volume in between the inner and outer pipe the water velocity will slow down dramatically to a point where sedimentation can occur and finer particles and near neutral sludge are removed through the secondary sludge outlet.

The larger the fish is in individual size the larger the desired water speed inside the tank will be. Often, desired water velocity inside a tank is expressed as the same value as the desired swimming speed of the fish. If achieved, it will result into fish swimming against the water movement but not moving relative to the tank.

Desired swimming speed of fish is often expressed as body lengths per second (bl/sec). For salmon a typical swimming speed range can be between 0.5-2.0 bl/sec. A more typical range can be between 1.0-1.5 bl/sec for smolt and post smolt production, and 0.7-1.2 bl/sec for full grown salmon.

This results into that a typical Salmon smolt of 100 gram with a body length of 21 cm would benefit from tank water velocity in the range of 21-32 cm/sec.

In comparison a full-grown Salmon at harvest size 5000 gram with a body length of 79 cm would benefit of tank water velocity between 55-95 cm/sec.

Accordingly, more benefits of the invention can be expected for larger fish tanks on land producing larger size fish.

The plant preferably comprises one or more inlets, such as three inlets arranged 120° apart, distributing the water in substance evenly over the water column of the tank, preferably adapted to distribute water identical as for the outlet with respect to elevation and/or circular flow. This means that the inlet or inlets comprise inlet openings at same elevation as corresponding outlet openings in the outer pipe, providing pure circular-radial flow directions if flow rate of sludge/water through the primary sludge outlet is disregarded. Thereby, a minimum of turbulence occurs, facilitating primary sludge separation. However, single point inlets and other inlet configurations are also feasible.

The invention also provides an outlet for a tank for aquaculture, for water treatment, for process water or process fluid cleaning, for drinking water cleaning, for water in oil separation, and/or as a general header tank outlet. The outlet is distinguished in that it comprises: two pipes, an outer pipe and an inner pipe, wherein the outer pipe is arranged outside the inner pipe, wherein the outer pipe extends from a bottom of the tank up to an upper end, and the outer pipe comprises openings distributed along the immersed part of the outer pipe, wherein the inner pipe extends from the bottom of the tank up to an inner pipe upper end, wherein a main outlet from the tank is arranged in the tank bottom in position inside the inner pipe, wherein the outer pipe is arranged inside a primary sludge outlet arranged in the tank bottom outside the outer pipe and a secondary sludge outlet is arranged in the tank bottom outside the inner pipe but inside the outer pipe.

The outlet preferably comprises openings arranged, preferably with filters or screens, distributed along and around the immersed part of the outer pipe, preferably with openings/filters-screens evenly distributed along and around the whole immersed part, for example every 0.5 m or 1 m elevation or every 30° or 60° around the circumference, and/or for the lowermost elevations, said openings are preferably omitted or can be closed, such as 1 m, 2 m or 3 m up from the tank bottom, and/or are preferably omitted or can be closed for the upper 1 m.

The invention also provides use of the outlet of the invention, in plants and/or tanks for aquaculture, for water treatment, for process water or process fluid cleaning, for drinking water cleaning, for water in oil separation, and/or as a general header tank outlet. The outlet is feasible for one stage separation of in principle any phase/substance/sludge that is near in density but is slightly heavier than a main fluid. The outlet can be arranged as submerged or immersed in a natural body of water or in a well, with natural flow from the primary and secondary sludge outlets if a lower elevation location is fluidly coupled thereto, or with the primary and secondary sludge outlets coupled to one or two pumps.

DETAILED DESCRIPTION OF THE INVENTION

The FIGURES are not to scale with respect to all elements, for clearly illustrating the features essential for the invention and discussed specifically for the respective figure. The embodiments illustrated are typical embodiments, several other embodiments within the scope of the invention are possible. Identical items have identical reference numbers.

Figure 1:
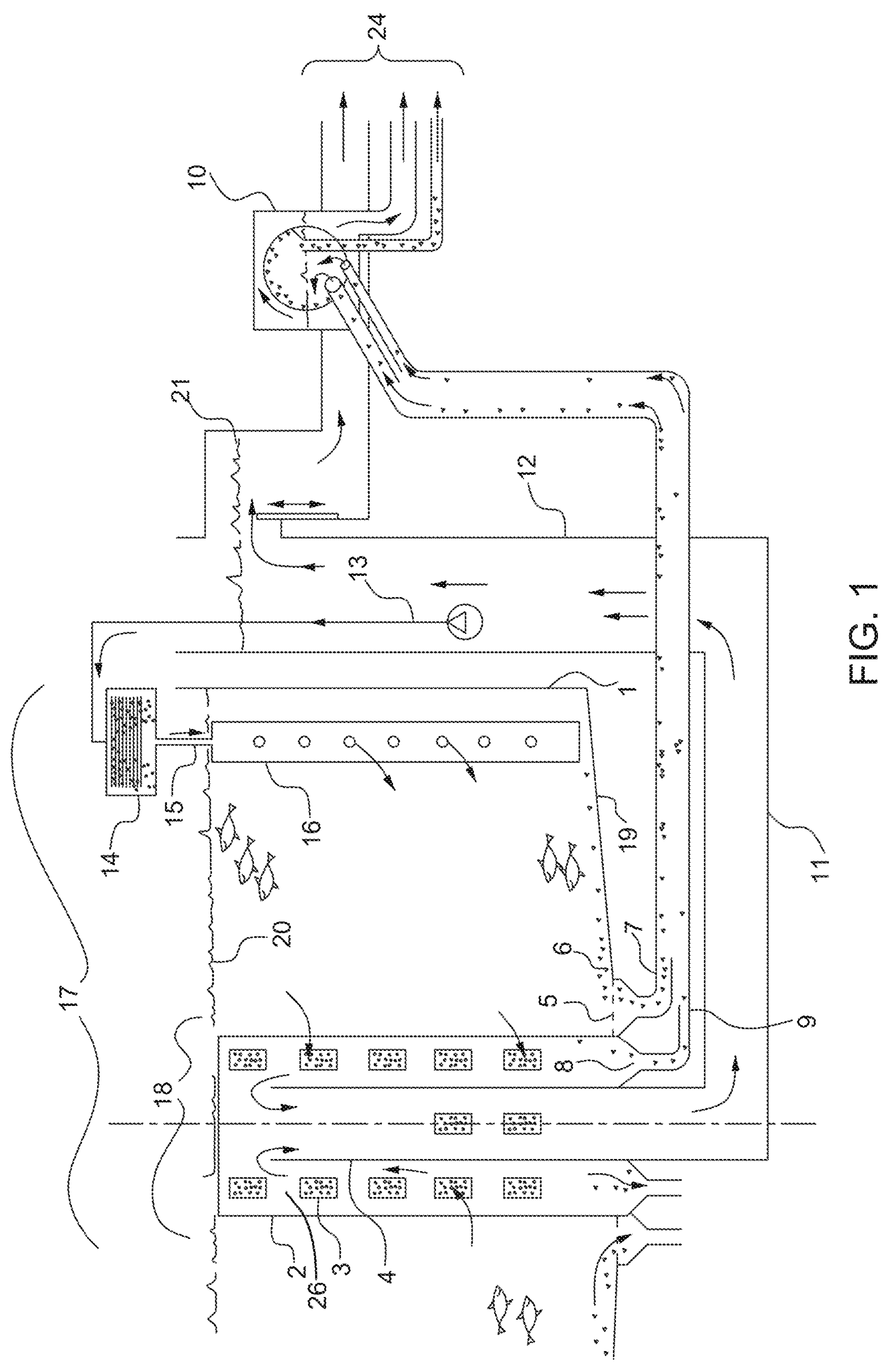
FIG. 1 illustrates an embodiment of a plant and an outlet of the invention.

Reference is made to FIG. 1, illustrating a typical embodiment of a plant or tank of the invention, comprising an outlet of the invention. FIG. 1 is a partial cross section of a plant 17 for aquaculture. A common vertical center axis runs through the center of tank 1, the center of the outer pipe 2 and the center of the inner pipe 4, as a common coaxial axis, as briefly indicated in the figure. The components tank wall 1, outer pipe 2, inner pipe 4, primary sludge outlet 5,7 and secondary sludge outlet 8,9 are symmetrical about the center axis, for the illustrated typical embodiment. A partial cross section, that is a cross section not covering the full tank 1 diameter, is illustrated in FIG. 1.

More specifically, FIG. 1 illustrates a plant 17 for aquaculture, for farming of fish or other aquatic species, comprising a semi-closed tank 1, an inlet 16 for water to the tank and an outlet 18 for water from the tank. The tank outlet 18 comprises two pipes, an outer pipe 2 and an inner pipe 4, wherein the outer pipe 2 is arranged outside the inner pipe 4. The outer pipe 2 extends from a bottom 19 of the tank up to below but near a tank water level 20. The outer pipe has closed upper end but comprises openings 3 distributed along the immersed part of the outer pipe. The inner pipe 4 extends from the bottom 19 of the tank at least up to an outlet elevation 21 where an outlet is arranged as an open inner pipe end and/or as openings of sufficient size through the inner pipe wall. The outlet elevation 21 is below the tank water level 20, and a main outlet 11 from the tank is arranged in the tank bottom in position within the inner pipe. The open upper end of the inner pipe, as illustrated, is at elevation of the outlet elevation 21 of a recirculation tank 12 or slightly above, to allow flow by gravity from the tank 1 to the recirculation tank 12. The tank further comprises a primary sludge outlet 5, 7, arranged in the tank bottom around the outer pipe, and a secondary sludge outlet 8, 9, arranged in the tank bottom around the inner pipe but inside the outer pipe. At reference number 24, an outlet for water is indicated. Lost water is replaced, preferably through the inlet or inlets. At reference number 26 an annular water column is illustrated, between inner pipe 4 and outer pipe 2.

As evident, the illustrated outlets for sludge are circular ducts under a respective screen. The screens are preferably replaceable. Respective outlets below the screens, are coupled to respective ducts. In many preferable embodiments, the primary sludge and/or the secondary sludge outlet openings are controllable, by comprising replaceable screens, actuators, or other control means. Thereby, the flow rates of sludge/water through said outlets can be controlled relative to the total flow rate through the tank or outlet and the contents and size of fish, enabling to control the ratio of water/sludge so as to enable only water through the main outlet feasible for recirculating without further sludge removal.

As evident from the figure, and as briefly illustrated by arrows, water flowing out from the main outlet 11 is recirculated, via pipe 12, pump 13 and $CO_2$ filter-aerator 14, recirculating about 50-60% of the water to the tank via pipe 15. Sludge is transported to filter 10 and can be used as fertilizer or as a component for a fertilizer. With the illustrated embodiment up to at least 70% recirculated water, via the main outlet, is feasible. The remaining 30% of outlet flow is shared between the primary sludge outlet and the secondary sludge outlet, typically with a majority of said flow through the primary sludge outlet.

Notice that water from the main outlet, containing water that has be separated twice, by separating out sludge through both primary and secondary sludge outlets, is bought to the recirculation tank 12, from where most of the water is recirculated back to the tank inlet, via aeration as required in filter 14. Some water from the recirculation tank is or can be brought to filter 10, whereto primary sludge and secondary sludge are brought, and where further separation of sludge takes place.

Figure 2:
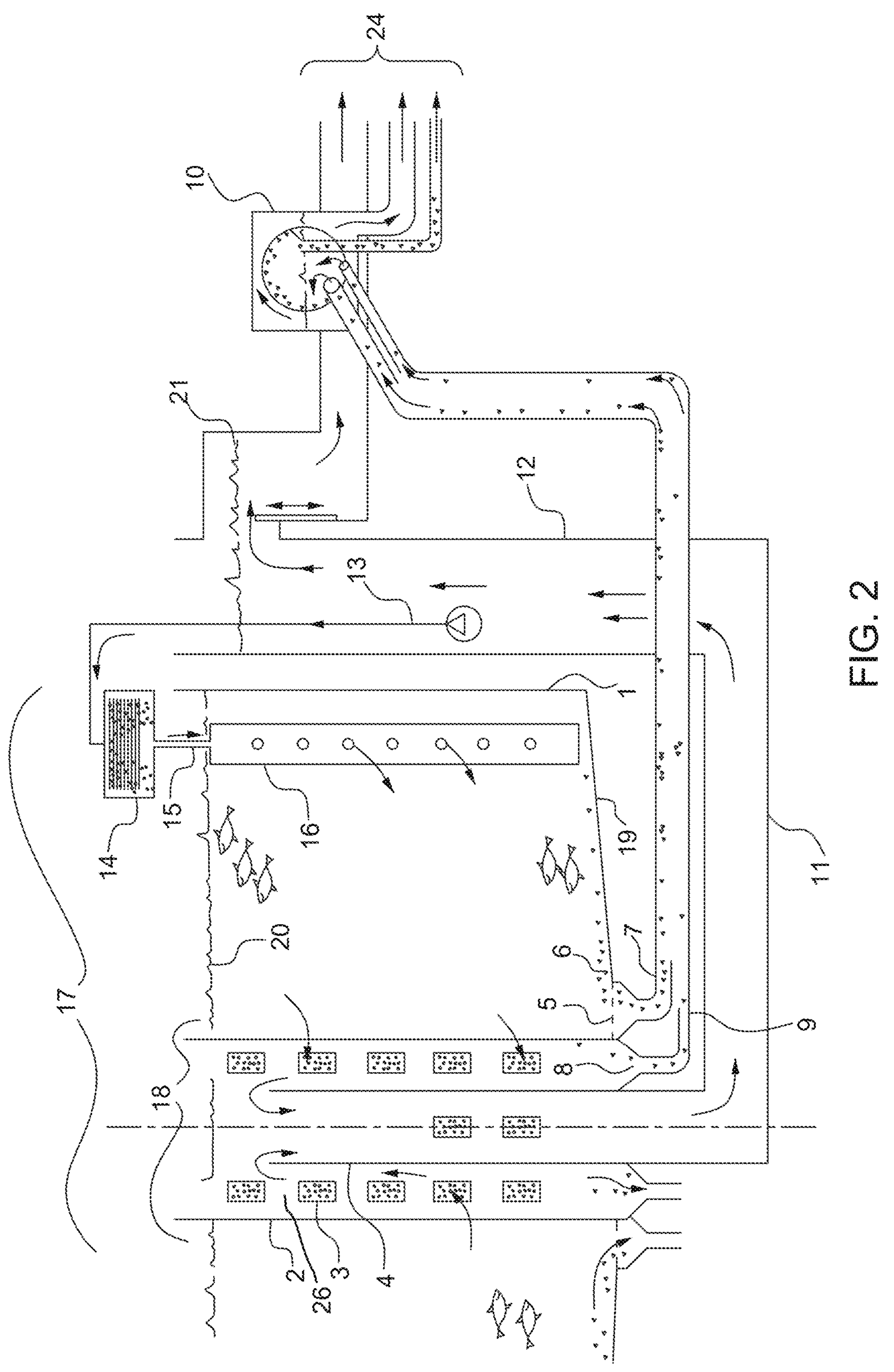
FIG. 2 illustrates a further embodiment of a plant and an outlet of the invention.

FIG. 2 illustrate a further embodiment of a plant of the invention, quite like the embodiment of FIG. 1, but with an outer pipe 2 with open upper end in the outlet, extending up above the tank water level 20. The inner pipe 4 of the outlet has outlet through an open upper end at the outlet elevation 21, or slightly above, depending on the flow situation.

Figure 3:
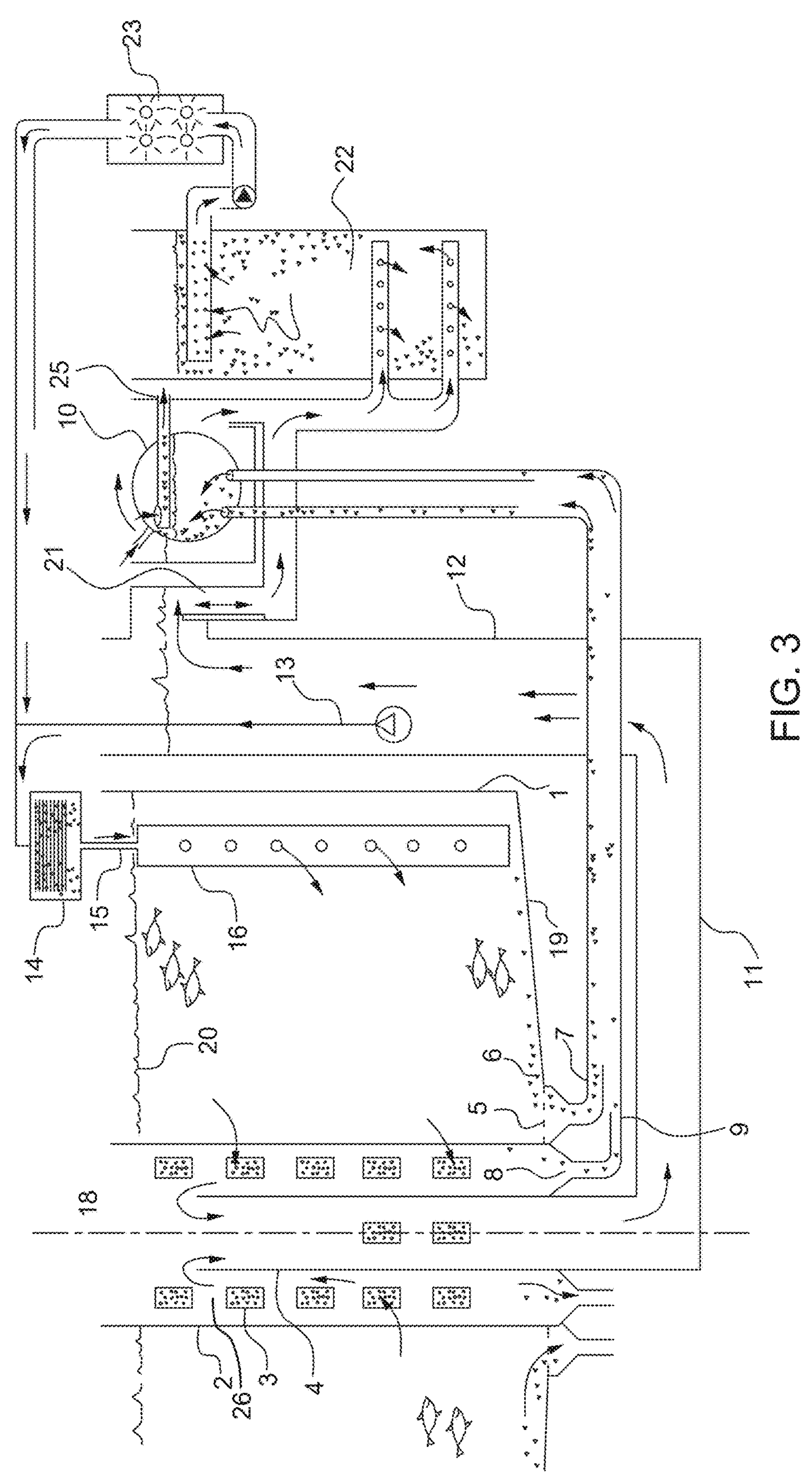
FIG. 3 illustrates a RAS-embodiment of a plant of the invention.

FIG. 3 illustrates a further plant embodiment of the invention, more specifically a typical RAS aquaculture plant. Again, the embodiment is quite like the embodiments of FIGS. 1 and 2, but with RAS almost all water is recirculated, and further water treatment is required. A biofilter stage 22 and an UV treatment stage 23 are added to the water treatment process. At reference number 25, an outlet for water is indicated.

The advantage of the invention compared to state-of-the-art plants increases with the requirement for recirculating water, since the recirculated water must be cleaned and conditioned to be fully feasible for aquaculture. The outlet of the plant of the invention separates out particles-sludge at the earliest stage possible, more tenderly and at the same time more effectively than usual, due to minimization of fragmentation and two stage separation, as described above. With RAS, for which recirculation of water is near 100%, the advantage of the invention is at maximum. If operating a RAS plant of the invention as designed, for example as illustrated in FIG. 3, only 10-30% of the water must be further cleaned and conditioned in terms of filtering out solids and particles as comparted to state of the art that filters the total recycling water flow, here excluding the aeration step 14 since all water recycled to the tank is aerated. For some embodiments also the biofiltering is excluded, since all recycled water for some embodiments is biofiltered. Considering the process facilities for water cleaning and conditioning downstream to the sludge outlets of the plant of the invention, the saving in process facilities downstream to the sludge outlets typically is 90-70%, compared to full cleaning and conditioning of all the water entering all of the outlets. The further advantage of the invention in RAS can result into a down scaling of biofilters as the biofilters become more efficient when organic matter is gently filtered out in two upstream stages. This is achieved by the invention as solids are not being crushed into smaller particles that would increase the dissolved organic load of the water that would reduce capacity of the biofilters.

With the present invention, surprisingly simple and effective water treatment is provided, due to the effective two stage sludge removal of the invention, enabling reduced investments and reduced operation cost.

The invention claimed is:

1. Plant for aquaculture, for farming of fish or other aquatic species, comprising a closed or semi-closed tank, at least one inlet for water to the tank and an outlet for water from the tank, wherein the outlet comprises two pipes, an outer pipe and an inner pipe, wherein the outer pipe is arranged outside the inner pipe, wherein the outer pipe extends from a bottom of the tank up to an outer pipe upper end, and the outer pipe comprises openings distributed along an immersed part of the outer pipe, wherein the inner pipe extends from the bottom of the tank up to an inner pipe upper end, and the inner pipe comprises an outlet opening at the inner pipe upper end and/or outlet openings at elevation below the inner pipe upper end, and wherein a main outlet from the tank is arranged in the tank bottom in a position inside the inner pipe, further comprising:

a primary sludge outlet, arranged in the tank bottom outside the outer pipe, and a secondary sludge outlet, arranged in the tank bottom outside the inner pipe but inside the outer pipe, and wherein water brought into the tank through the at least one inlet comprises circular and radial and laminar and/or diverging flow, into and through the openings distributed along the immersed part of the outer pipe, into an annular water column formed between the inner and outer pipe, upwards through the annular water column, into and through the inner pipe outlet, down the inner pipe and out through the main outlet, whilst sludge is separated and brought out from the tank through the primary sludge outlet and the secondary sludge outlet.

2. Plant according to claim 1, wherein the outer pipe extends up to an upper end, at, above or below a tank water level.

3. Plant according to claim 1, wherein the inner pipe comprises the outlet opening at the inner pipe upper end.

4. Plant for aquaculture according to claim 1, wherein the primary sludge and/or the secondary sludge outlet openings are controllable, by comprising replaceable screens or actuators, enabling control of the flow rates of sludge/water through said outlets relative to the total flow rate through the tank or main outlet and the contents and size of fish.

5. Plant for aquaculture according to claim 1, wherein the outer pipe and/or the inner pipe comprises openings arranged with filters or screens, and/or the plant comprises level control of the tank water level.

6. Plant for aquaculture according to claim 1, comprising an inlet distributing the water corresponding to the outlet openings along the immersed part of the outer pipe with respect to elevation.

7. Outlet for a tank for aquaculture or process liquid, wherein the outlet comprises: two pipes, an outer pipe and an inner pipe, wherein the outer pipe is arranged outside the inner pipe, wherein the outer pipe extends from a bottom of the tank up to an upper end, and the outer pipe comprises openings distributed along an immersed part of the outer pipe, wherein the inner pipe extends from the bottom of the tank up to an inner pipe upper end, wherein a main outlet from the tank is arranged in the tank bottom in position inside the inner pipe, and wherein the outer pipe is arranged inside a primary sludge outlet arranged in the tank bottom outside the outer pipe and a secondary sludge outlet is arranged in the tank bottom outside the inner pipe but inside the outer pipe.

8. Outlet according to claim 7, wherein the outlet is arranged in a tank for aquaculture, in a tank for water treatment, in a tank for process water cleaning, in a tank for drinking water cleaning, and/or as a header tank outlet.

9. Outlet according to claim 7, wherein the primary sludge and/or the secondary sludge outlet openings are controllable, by comprising replaceable screens or actuators, enabling control of the flow rates of sludge/water through said outlets relative to the total flow rate through the tank or main outlet.

10. A method of use comprising: utilizing the outlet of claim 7 to drain fluid for aquaculture, water treatment, process water cleaning, drinking water cleaning, water in oil separation, and/or as a header tank outlet.

* * * * *